Patented Aug. 7, 1928.

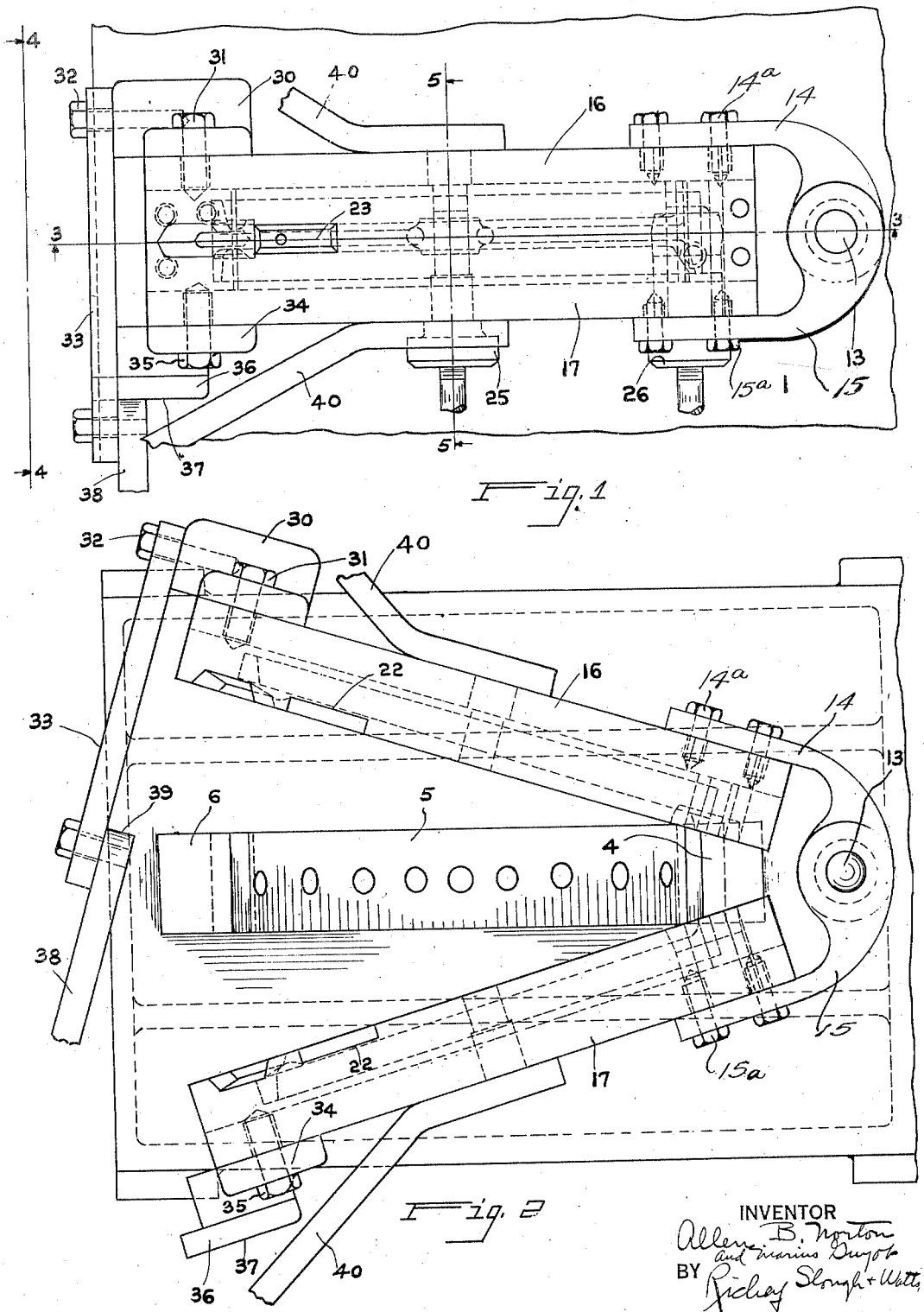

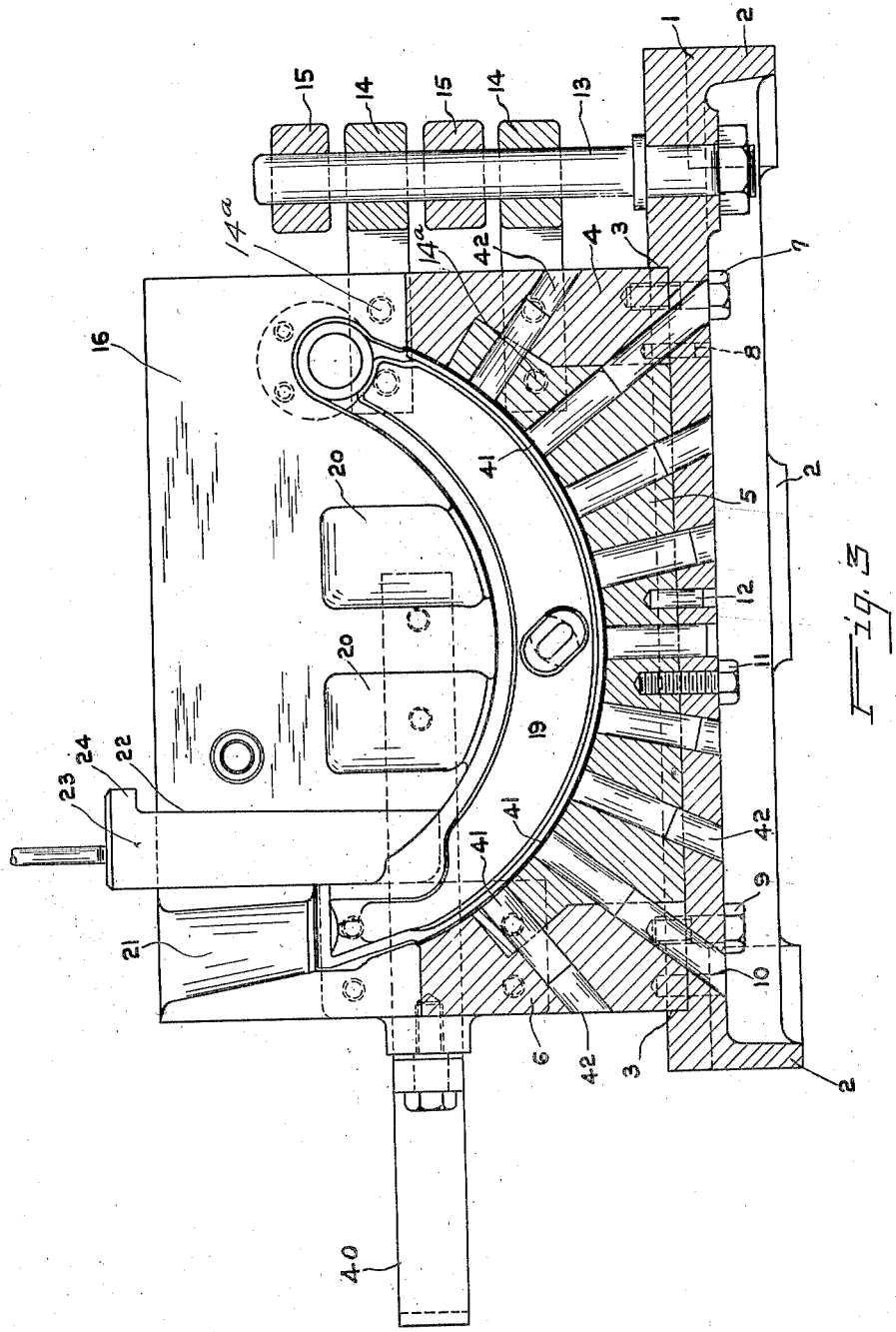

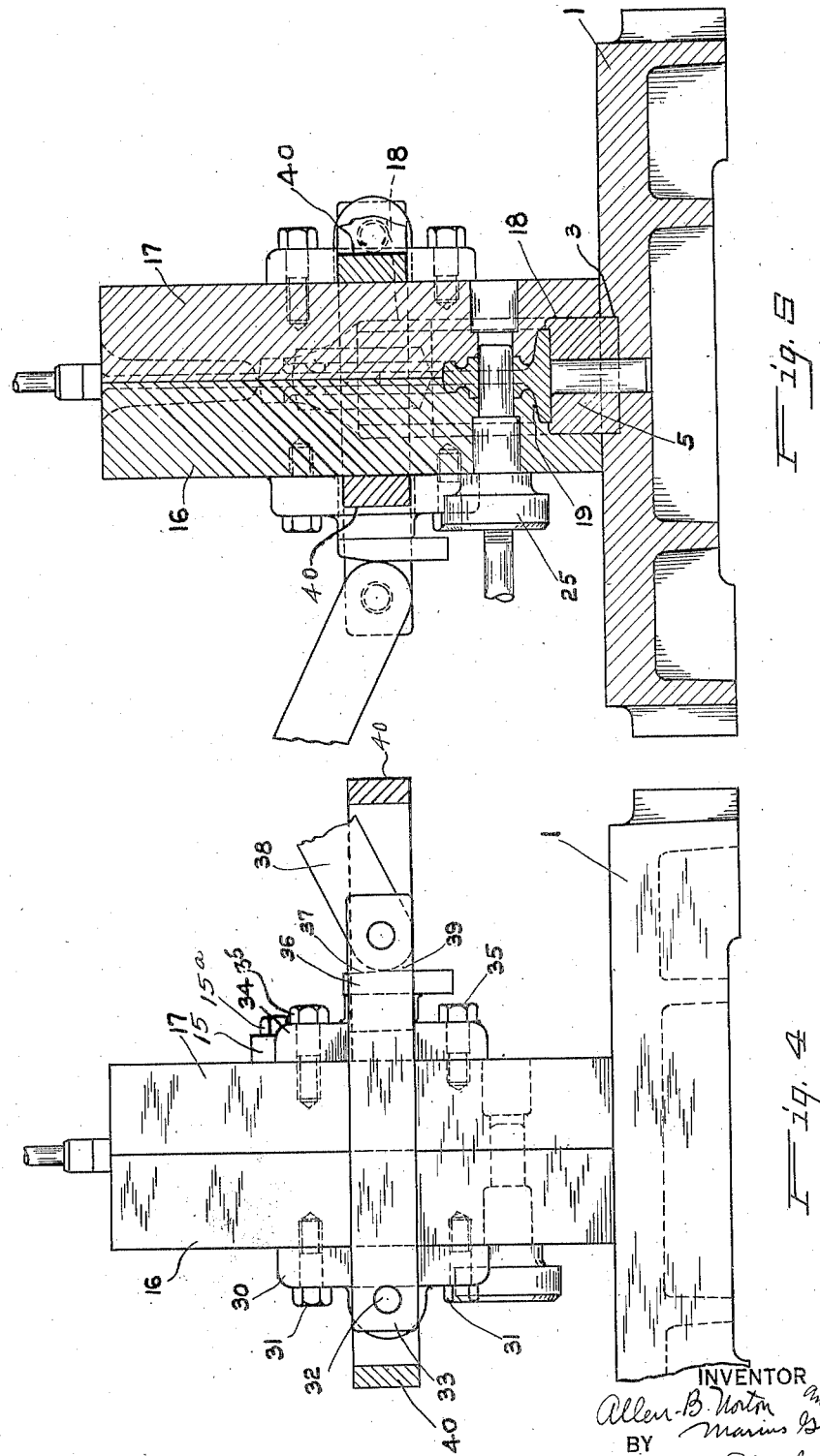

1,679,870

UNITED STATES PATENT OFFICE.

ALLEN B. NORTON AND MARIUS GUYOT, OF CLEVELAND, OHIO, ASSIGNORS TO ALUMINUM COMPANY OF AMERICA, OF PITTSBURGH, PENNSYLVANIA, A CORPORATION OF PENNSYLVANIA.

METHOD OF AND MOLD FOR MAKING CASTINGS.

Application filed April 13, 1925. Serial No. 22,766.

This invention relates to permanent molds for casting articles composed of relatively high melting point metals, such as aluminum and its alloys and metals having higher melting points than aluminum.

One object of the invention is to control the amount and nature of the distortion or warpage of the parts of a permanent mold.

Another object is to devise a new and improved method of making castings of high melting point metals.

Another object is to construct a permanent mold, for casting high melting point metals, composed of a plurality of mold parts which are of various sizes, shapes and cross sectional dimensions, which will be substantially isoexpansive, and individually expansible without objectionable warpage, permanent distortion, or restraint, and in which the amount and distribution of heat may be predetermined and controlled within certain limits.

The practice of casting metallic articles in molds composed of permanent material, for example iron and steel, has heretofore been somewhat limited because of difficulties traceable to a tendency of the mold parts to expand unequally, distort, or warp out of shape either temporarily during the casting operation or permanently. Whenever any of these tendencies became pronounced, as was frequently the case with molds for casting metals having a high melting point, for example from about 500° C. and above, unequal expansion and distortion of the mold parts was indicated by misalignment of the mold parts and by the resulting castings which were not exactly true to size or shape, or which had fins formed thereon. Frequently castings were so distorted as to be unsalable while other castings required additional trimming and machining operations to bring them to suitable size and shape, to provide for which operations the castings were often made larger than the desired finished size. These practices and troubles have limited the commercial field heretofore available to the permanent mold casting art.

So far as we are aware the causes of the distortion, warpage and unequal expansion of mold parts has been little understood and little or no progress has been made in discovering these causes or avoiding the results, except that it was known that annealing a metal mold part before using would relieve certain internal strains which may have had some effect on distortion of the part when in use. We have discovered, however, that such annealing of a mold part has but slight effect in preventing permanent distortion thereof and even less effect in preventing the temporary warpage and expansion of a part.

We have discovered that when the expansion of a mold part is restrained or obstructed, as by another part contacting therewith, the expanding part becomes warped or distorted. When an otherwise non-warping part is free to expand without restraint being offered thereto by other mold parts distortion or warpage of the part is negligible.

We have also discovered that when co-operating mold parts expand to different amounts the dimensions or configuration of the casting cavity are often altered with consequent distortion or change in castings which are made therein. When non-warping mold parts and particularly those directly forming the casting cavity are substantially isoexpansive the dimensions and configuration of the casting cavity remain substantially unchanged.

We have further discovered that warpage and distortion are, to a large extent, the results of strains set up in a mold part by unequal expansion which, in turn, is the result of non-uniform distribution of heat throughout the mold part. When an unrestrained mold part is uniformly heated, the warpage becomes negligible. Mold parts having non-uniform sections, strengthening or heat radiating projections, webs, ribs and the like tend to become non-uniformly heated and hence to distort or warp when heated.

We are enabled by our discoveries and by our invention based thereon to construct permanent molds composed, for example, of iron or steel, for casting metals having high melting points, that is, above about 500° C., in which relatively large mold parts may be employed, without experiencing the above described troubles and disadvantages. We are further enabled to construct permanent molds for casting high melting point metals in which variously sized and shaped mold parts will be made substantially isoexpansive and substantially free from temporary or permanent warpage and distortion.

Among the practical results of our invention are the following achievements: A marked increase in the maximum size of mold parts over that heretofore commercially practicable and thereby to build larger commercial molds and produce larger sized castings than heretofore, as a result of which we have extended the permanent mold casting art well beyond its previous limitations and into commercial competition with other molds and other manufacturing processes; castings made more nearly to the desired size, whether the castings be large or small, thereby eliminating the use of much excess metal and a large part of the customary machining; the construction of parts for permanent molds for casting high melting point metals which, during operation, require less externally applied heat than prior art molds; which may be cast in permanent molds with all the attendant advantages of low cost and desirable metallic structure; which require a minimum amount of altering after initial heating to compensate for warpage or distortion and which warp or distort not more than a negligible amount.

In the drawing accompanying this specification and forming a part thereof:

Figure 1 is a top plan view of one form of mold embodying our invention;

Figure 2 is a view similar to Fig. 1 but with certain mold parts separated;

Figure 3 is a vertical view taken on line 3—3 of Fig. 1 showing certain of the parts in section and other parts in side elevation;

Figure 4 is an end elevation taken in the direction indicated by line 4—4 of Fig. 1, and Figure 5 is a vertical sectional view taken on line 5—5 of Fig. 1.

One form of mold embodying our invention and illustrated in the attached drawings comprise a supporting member or mold base 1 resting on depending flanges or legs 2 and provided on its top surface with a recess 3. Mold parts 4 and 6 rest on and are supported by mold base 1. Preferably these parts seat in recess 3 with part 4 being located at the end of the recess adjacent to the rear end of the base 1.

Parts 4, 5 and 6 are preferably secured to base 1 and in a manner to permit unrestrained expansion of the parts with respect to the base 1 and each other. A cap screw 7 and a dowel pin 8 serve to position and secure the part 4 to base 1 and properly align it with respect to the other parts of the mold. Mold part 6 is similarly secured in the recess 3 near what may be termed the front end of mold base 1 by similar cap screws 9 and dowel pin 10, while the large mold part 5 is secured in the recess 3 between the parts 4 and 6 and in cooperation therewith, as by means of cap screw 11 and a dowel pin 12. It will be noted that the cap screws and dowel pins are located at points substantially in the center of the ends of the respective mold parts and that these connecting members constitute the only connection between the parts and the mold base 1. The parts 4, 5 and 6 when assembled as shown, provide slight clearances between each other which are too small to be shown on the drawings but which may amount to several thousandths of an inch. Such clearances permit unrestrained expansion of the parts while still preventing escape of molten metal therebetween.

At the rear end of the mold base 1 is provided means for connecting mold parts movable to the base 1 comprising a pivot pin 13 which extends upwardly beyond the top surface of the mold base and acts as a hinge pin for hinge parts 14 and 15 detachably connected respectively to two large movable mold parts or mold halves 16 and 17 as by cap screws 14$^a$ and 15$^a$ which parts preferably rest slidably on the top surface of the mold base 1, as in Figs. 4 and 5 and are adapted to swing about the hinge pin 13 to open and close the mold, as is indicated in Fig. 2. The inner or adjacent faces of the mold halves 16 and 17 are recessed at the bottom part thereof as indicated at 18, to receive therebetween the stationary mold parts 4, 5 and 6 and are also recessed above the top surfaces of these same mold parts to provide mold cavities including a casting cavity 19 to which is connected one or more riser cavities 20 and a gate cavity 21.

The inner faces of the mold halves 16 and 17 are also recessed as at 22 to receive a core 23 extending downwardly into the casting cavity 19 and provided with an outstanding flange 24 at its upper end to seat on the top surface of the mold halves when the mold is closed to maintain the core in proper position with respect to the casting cavity. Cores 25 and 26 which project into the casting cavity in lines substantially perpendicular to the mold halves serve to provide cored-out bosses on the casting.

At the front end of the mold halves 16 and 17 we have provided means for locking the free ends of the mold halves together and in cooperating engagement with the stationary mold parts 4, 5 and 6. This means, as illustrated, comprises a bracket 30 secured to one mold half 16 by cap screws 31 and carrying a pin 32 to which is rotatably secured a locking bar 33. A bracket 34 similarly secured as by cap screws 35 to the other mold half has an outer portion 36 provided with outer upwardly and inwardly inclined side wall 37. To the end of the locking bar 33 adjacent to bracket 34 is pivotally secured an arm 38 having a handle, not shown, at one end and a cam surface 39 at the other end to engage the surface 37 of the bracket 34. The mold halves may be drawn together tightly when force is applied downwardly on the free end of the arm 38 and when force is applied upwardly to the arm 38 they may be quickly separated. Due to the size, shape and arrangement of the parts 33 and 38 locking pressure on the mold halves may be released and one mold half moved away from the other mold parts by a single substantially continuous motion of the operator. A handle 40 secured to each mold half 16 and 17 serves as a means to move the halves with respect to parts 4, 5 and 6.

It will be noted that the large mold halves 16 and 17 are of approximately the same thickness throughout their entire extent and also that these parts have substantially parallel inner and outer surfaces, there being no extended portions, such as strengthening or heat radiating ribs or webs projecting outwardly from the outer surface of these parts.

The mold cavities in these halves are so disposed that the heat from the molten metal therein will quickly spread to all portions of the halves and heat the halves substantially uniformly throughout. The cavities are also of such size with respect to the size and heat radiating capacities of the respective parts that the molten metal will heat the molten metal engaging mold parts all to substantially the same temperature. We prefer to machine the inner and outer side surfaces of the mold halves 16 and 17, that is the adjacent faces and the exterior surfaces opposite thereto, so as to relieve as far as possible any strains set up in the mold parts when the parts were being cast.

It will be also noted that mold parts 4 and 6 are small as compared with large part 5 and that the latter part although irregular in shape resembles in size the large mold parts 16 and 17, which have large heat radiating surfaces in contact with the atmosphere and by which part 5 is engaged on two sides. These parts 4, 5 and 6 are provided with a longitudinally curved, transversely flat upper surface constituting the bottom wall of the casting cavity 19 against which the braking surface of a brake shoe is cast. Means are provided to insure substantially equal heat distribution in mold part 5 thereby preventing warpage or distortion of the part and means are also provided to cause expansion and contraction of mold part 5 in substantially the same rate and amount as that of the large mold parts 4, 6, 16 and 17. These means comprise a number of inserts 41, preferably composed of a relatively good heat conducting metal, such for example as copper, are disposed in suitably formed openings 42 in the mold parts 4, 5 and 6, as shown in Fig. 3, these inserts serving to conduct heat away from the metal being cast in the casting cavity to points in the mold parts 4, 5 and 6 remote from the casting cavity 19, thereby tending to distribute the heat of the casting to remote portions of the mold parts and thus maintain the parts at substantially the same temperature, with the heat in each part being distributed substantially uniformly throughout the part regardless of the size and shape thereof. Although the mold parts 4, 5 and 6 are shown with what appears to be tight fits therebetween, it will be understood that a small clearance, for example four or five thousandths of an inch, is provided at the meeting faces of these parts to accommodate expansion of the parts and particularly of mold part 5 under the heat of the metal being cast without any restraint being imposed by any of these parts to the expansion of another. Although the inserts 41 fit closely enough in the openings 42 so that they will remain in position at all times, they do not interpose any noticeable interference to the free expansion and contraction of the parts 4, 5 and 6 with respect to each other where an insert extends into two of the parts inasmuch as they are composed of soft material which is readily bent or distorted by the expanding parts.

It will be noted that the large mold part 5 presents a surface to the casting cavity 19 which is relatively small as compared with the corresponding surfaces of mold halves 16 and 17 and further that the mold part 5 is surrounded on all sides when the mold is closed by mold parts so that the heat radiating surfaces of the part 5 are not exposed to the open air. Thermal breaks in the form of air spaces are interposed to obstruct the flow of heat from the part 5 to these other parts. The total size and total area of the part 5 in direct contact with molten metal being cast is suitably proportioned with respect to the nature and size of its heat radiating capacity and the heat radiating capacities of the remaining mold parts, so that the part is substantially isothermal and is substantially isoexpansive with the mold parts 4, 6, 16 and 17. There is no appreciable tendency of mold base 1 which supports the parts to distort or warp due to the heat therein, since it does not readily absorb heat from the adjacent contacting mold parts and also because mold base 1 tends to remain relatively cool owing to the fact that its heat radiating capacity is large as compared to its opportunities for heat absorption.

In constructing a mold according to our method, a casting cavity of the desired size is first laid out and the necessary mold wall thickness is provided thereabout. Next, the requisite number of mold parts is determined and the size and shape of each part is then fixed taking into account the necessary mold wall thickness, the desired size, number and disposition of the mold cavities, the desired heat radiating capacity of each part with respect to the other parts, the amount of heat to be transmitted thereto by the molten metal being cast, and the desired temperature of each part when in operation.

The points of application of heat to the mold parts are controlled by the location in the parts of the cavities 19, 20 and 21, the amount of heat supplied to the parts is controlled by the size of the mold cavities and the consequent amount of highly heated molten metal that the cavities may contain, and the temperature of the mold parts is in part controlled by the heat radiating capacity and size of the parts.

For example, in constructing the brake shoe mold herein described and shown, the brake shoe and gate cavities were laid out and the minimum permissible wall thicknesses about these cavities were indicated. The number and shape of the necessary mold parts was then determined. Finally the size of each part and the size and disposition therein of the molten metal cavities was determined. This was accomplished as follows: The curved mold part 5 was to seat on the base 1 and to be surrounded by parts 4, 6, 16 and 17. Because of its small heat radiating capacity and also its non-uniform section, good heat conducting means 41 were placed therein by which heat was rapidly conducted to all portions of the mold part and to the surrounding parts 4, 6 and 1.

The plugs 41 also served to make uniform the temperature throughout parts 4 and 6 and keep them at about the same temperature as part 5. The height of parts 16 and 17 was determined by the necessary height of gate 21. This provided considerable expanse of mold part remote from the casting cavity. Accordingly, risers 20 were formed therein and extended vertically and laterally sufficiently to insure substantially uniform heating of the parts 16 and 17 throughout. The size of the surfaces of parts 16 and 17 in contact with the molten metal, as compared with similar surfaces of other mold parts, was made such that the parts 16 and 17 with their larger heat radiating surfaces would be maintained at about the same temperature as the remaining mold parts.

In operating the mold described hereinabove, the mold having been brought to a suitable temperature and the parts 4, 5 and 6 having been assembled on mold half 1, as shown, the mold halves 16 and 17 are brought into substantially the position shown in Fig. 1 and are locked in such position by the locking bar 33 and arm 38. The cores 23, 25 and 26 are then assembled, as shown in Fig. 1, after which molten metal of the desired composition is poured into the gate recess 21 from which it flows into the casting cavity 19 and riser cavities 20, filling these cavities and the gate cavity 21. As soon as the metal has set and cooled sufficiently, the core pins 23, 25 and 26 are withdrawn, the arm 38 is moved to release the surface 39 from contact with surface 37 and with the same movement the bar 38 is rotated about pin 32, and mold half 17 withdrawn horizontally across the top of mold base 1 into a position substantially as shown in Fig. 2. The mold half 16 may be moved into a similar position away from mold parts 4, 5 and 6 by handle 40 and the casting seating thereon, after which the casting with the gate and risers attached may be removed and the mold then reassembled preparatory to the making of another casting.

Mold parts 4, 5 and 6 although of different sizes and irregularly shaped are substantially isoexpansive and isothermal, the inserts 41 acting to conduct heat from the metal being cast into these three parts at such a rate that the temperature of each of the parts is approximately the same and the heat of each part is distributed throughout the part substantially uniformly. The parts are connected to the base 1 to which the mold halves 16 and 17 are also connected, each at a central point and each part is permitted to expand or contact with respect to each other, due to the slight clearance between the parts, without restraint and without transmitting undesirable stresses to mold parts in contact therewith. Due to this unrestrained expansion and contraction, and to the nearly equal temperatures of the parts and the nearly equal distribution of the heat in each part, these three mold parts tend to expand to substantially the same extent as the mold parts 16 and 17 and without undue warpage or noticeable distortion. The original alignment of the parts 4, 5 and 6 with respect to each other and to the parts 16 and 17 is thus maintained throughout the ordinary range of operating temperatures.

Although we have set forth our invention hereinabove and in the drawings in some detail, we do not desire to be limited thereto, since changes therein not amounting to invention may be made without departing from the spirit of the invention. The scope of our invention is defined in what is claimed.

What is claimed is:

1. The method of controllably restricting the distortion and warpage of a solid, permanent mold part which comprises applying heat in predetermined amounts to a predetermined portion or portions of the inner surface of a solid permanent mold part during use of the part thereby controllably restricting the distortion and warpage of the part.

2. The method of controllably restricting the distortion and warpage of a solid, permanent mold part which comprises applying heat in predetermined amounts to a predetermined portion or portions of the inner surface of a solid, permanent mold part, formed to distribute heat from the inner surface substantially uniformly throughout the mold part to all portions thereof, thereby controllably restricting the distortion and warpage of the part.

3. The method of casting high melting point metals in a permanent mold which comprises providing cooperating solid mold parts forming mold cavities, introducing molten metal into the mold cavities formed by cooperating solid mold parts thereby heating the surfaces of the mold parts in contact with the molten metal, conducting the heat from the said surfaces substantially uniformly throughout each of the said mold parts, cooling the molten metal and removing the cast metal from the mold.

4. The method of casting high melting point metals in a permanent mold which comprises providing cooperating solid mold parts forming mold cavities, introducing high melting point molten metal into the mold cavities and thereby heating the surfaces of the mold parts in contact with the molten metal, conducting heat from the said molten metal substantially uniformly to all portions of each of the said mold parts and heating all the parts to substantially the same temperature, cooling the molten metal and removing the cast metal from the mold.

5. The method of casting high melting point metal in a permanent mold which comprises providing solid mold parts cooperating to form mold cavities therebetween, introducing molten metal into the mold cavities controlling the amount of heat applied to the mold part by the molten metal and controlling the distribution of such heat throughout the mold parts thereby, controllably restricting the distortion and warpage of the mold parts in contact with the molten metal, permitting the molten metal to cool and removing the solidified metal from the mold.

6. A substantially non-warping, non-distorting, solid mold part for a permanent metal mold for casting high melting point metals, comprising a solid metal body having a surface formed to engage with the molten metal to be cast, and other surfaces formed to engage operatively with cooperating mold parts to constitute a mold, the said part being adapted to conduct heat from the molten metal throughout the part to heat all portions thereof to substantially the same temperature.

7. The method of controllably restricting the distortion and warpage of the solid parts of a permanent metal mold which comprises providing solid metal mold parts formed with one or more surfaces to engage high melting point molten metals, and conducting heat from the molten metal throughout the mold parts in a manner to heat each part substantially uniformly throughout.

8. The method of controllably restricting the distortion and warpage of the solid part of a permanent metal mold which comprises providing a plurality of mold parts including a solid part of substantially uniform cross section, and disposing one or more surfaces on the said part for contact with molten metal being cast so that heat transmitted from the molten metal in contact therewith to the mold part will be distributed substantially uniformly throughout the part.

9. The method of controllably restricting the distortion and warpage of the solid parts of a permanent metal mold which comprises providing a plurality of mold parts, including a solid part of non-uniform cross section, forming thereon a surface for contact with the molten metal to be cast, and providing means in the part for conducting heat from molten metal in contact with the part substantially uniformly throughout the part.

10. The method of controllably restricting the distortion and warpage of the solid parts of a permanent metal mold which comprises providing a plurality of solid mold parts, including parts of various cross sectional configurations, forming one or more surfaces on each mold part for contact with molten metal to be cast and conducting throughout each said mold part, substantially uniformly to all portions thereof, the heat transmitted to the mold part from the molten metal in contact therewith.

11. The method of controllably restricting the distortion and warpage of the solid parts of a multipart metal mold for casting high melting point metal which comprises providing solid mold parts cooperating to form therebetween casting cavities for molten metal to be cast, disposing the molten metal engaging surface, or surfaces, on each part, with respect to the shape and configuration of the part, so that the heat transmitted to the part by the molten metal will heat the part to substantially uniform temperature throughout.

12. The method of controllably restricting the distortion and warpage of the solid parts of a multipart metal mold for casting high melting point metal which comprises providing solid mold parts cooperating to form therebetween casting cavities for molten metal to be cast, disposing the molten metal engaging surface, or surfaces, on each part, with respect both to the cross sectional configuration and to the heat radiating capacities of the part, so that the heat transmitted to the part by the molten metal will heat the part substantially uniformly throughout and to a predetermined temperature.

13. The method of controllably restricting the distortion and warpage of the solid parts of a multipart metal mold for casting high melting point metal which comprises providing on each solid mold part a molten metal engaging surface, or surfaces, of such size, with respect to the heat radiating capacities of the respective parts and size and configuration of the mold part, that the heat transmitted to the respective mold part by the molten metal will heat the molten metal engaging mold parts each uniformly throughout and all to substantially the same temperature.

14. A substantially non-warping, non-distortable mold for casting high melting point metals which comprises a plurality of solid, metal, mold parts cooperating to form a mold having cavities for molten metal, certain of the mold parts having molten metal engaging surfaces disposed thereon in such position with reference to the size and shape of the parts that the molten metal in contact therewith will heat each such part substantially uniformly throughout and all such parts to substantially the same temperature, certain of the parts being of irregular section and having means therein for conducting heat therethrough from the molten metal and said surfaces to remote portions of the part more rapidly than through the part itself, and maintainig the temeprature throughout the mold part substantially uniform and substantially equal to the temperature of the remaining molten metal engaging mold parts.

15. The method of casting high melting point metals in a multipart permanent metal mold which comprises providing a plurality of cooperating, solid mold parts having cavities for molten metal formed in the inner surfaces thereof, introducing high melting point molten metal into the said cavities thereby transmitting heat to the mold parts in contact with the molten metal, conducting heat from the molten metal throughout each mold part to heat all portions thereof to substantially the same temperature, cooling the molten metal and removing the cast metal from the mold.

16. The method of casting high melting point metals in a multipart permanent metal mold which comprises providing a plurality of cooperating, solid mold parts having cavities for molten metal formed in the inner surfaces thereof, introducing high melting point molten metal into the said cavities thereby transmitting heat to the mold parts in contact with the molten metal, conducting heat from the molten metal throughout each mold part to heat all portions thereof to substantially the same temperature and to heat all the mold parts in contact with the molten metal to substantially the same temperature, cooling the molten metal and removing the cast metal from the mold.

17. The method of casting high melting point metals in a multipart, permanent mold which comprises providing a pluralitly of solid mold parts cooperating to form therebetween cavities for molten metal, heating the mold parts which form the said cavities each substantially uniformly throughout and all to substantially the same temperature, introducing high melting point metal into the said cavities and permitting it to solidify, and removing the solidified metal.

18. The method of preventing warpage in a permanent mold composed of parts differing from each other, which consists in bringing a predetermined amount of highly heated molten metal into contact with predetermined portions of the inner surfaces of the mold part, and thereby maintaining all the parts at the same or substantially the same temperature during the operation of the mold and preventing warpage of the mold part.

19. The method of making castings in permanent molds composed of irregular parts, which consists in applying to each part heat regulating means to compensate for the irregularity of each part and maintaining said parts at the temperatures which prevent warpage of one part with respect to any other part.

20. A multipart mold for casting high melting point metals which includes a plurality of solid large mold parts substantially isoexpansive and adapted by reason of the substantially uniform distribution of heat throughout the part to maintain the dimensions of the mold cavities substantially unchanged under operating temperatures.

21. A multipart mold for casting high melting point metals comprising a plurality of large solid mold parts which are substantially isothermal, isoexpansive and non-warping forming certain walls of a casting cavity and a large, irregular, non-warping mold part forming a wall of the casting cavity and provided with means for rendering the said part substantially isoexpansive and isothermal as compared with the said plurality of mold parts.

22. A multipart mold for casting high melting point metals comprising a plurality of large mold parts forming a casting cavity, certain of the said mold parts having relatively large heat radiating surfaces exposed to the air as compared with certain of the remaining mold parts and means for rendering the temperature of the various said mold parts substantially equal.

23. A multipart permanent mold for casting high melting point metals comprising a plurality of large, substantially iso-expansive mold parts of different sizes each constituting different sized walls of the casting cavity.

24. A mold to be operated at high temperatures for the casting of irregularly shaped metal articles from molten metal which has a high melting point and which transmits considerable heat to the mold in the process of casting, comprising a plurality of irregularly shaped parts, one of which parts is adapted to expand during use differently from another, and means to equalize the expansion of said parts to maintain iso-expansion of the mold parts during use.

25. A mold to be operated at high temperature for the casting of irregularly shaped metal articles from molten metal which has a high melting point and which transmits considerable heat to the mold in the process of casting, comprising a plurality of large irregularly shaped parts, one of which parts transmits heat from the casting metal more rapidly than another, and means comprising thermal breaks to equalize the expansion of the said mold parts during use in the casting operation.

26. A mold to be operated at high temperatures for the casting of irregularly shaped metal articles from molten metal which has a high melting point and which transmits considerable heat to the mold in the process of casting, comprising a plurality of large irregularly shaped parts of different sizes, one of which parts is adapted to expand differently from another in the casting operation and one of which parts absorbs heat from the casting metal more rapidly than another, and means to maintain substantial equality of expansion of the mold parts during the casting operation.

27. A mold to be operated at high temperatures for the casting of irregularly shaped articles from molten metal having a high melting point and which transmits considerable heat to the mold in the process of casting comprising a plurality of separate, large, solid, irregularly shaped, isoexpansive mold parts of different sizes forming a casting cavity, each of the mold parts being substantially non-warping during the casting operation.

28. A mold for casting articles composed of high melting point metals which comprises a plurality of separable mold parts of different sizes operatively assembled together and forming a casting cavity, each of the mold parts being of minimum permissible thickness and having a low temperature difference throughout the portions thereof.

29. The art of preventing warpage of the part of a permanent mold which comprises maintaining mold parts of different sizes at a temperature below that of molten metal being cast, transmitting heat from the molten metal to the mold parts at predetermined points and in amounts thus preventing unequal expansion and warpage of the mold parts with respect to each other, and finally removing the casting from the mold.

30. The method of making a plurality of substantially identically formed irregularly shaped castings from a relatively high melting point metal, which consists in pouring the molten metal into a mold provided with a casting cavity, transmitting the heat of the metal being cast through the solid mold parts forming the casting cavity in a manner to cause the large mold parts to expand substantially equally without objectionable distortion and removing the casting from the cavity after solidification.

31. A permanent mold for casting a brake shoe having a chilled braking surface free from taper transversely thereof which comprises a base, and stationary and movable solid members on the base and cooperating to form a casting cavity for a brake shoe between their meeting faces, the surface of each stationary part against which the braking surface of the brake shoe is cast being curved in the direction of the length of the cavity and being plane in a direction transversely thereof.

32. A permanent mold comprising a mold base, a stationary member on the base forming a bottom wall for a casting cavity and connected to the base for unrestrained expansion in all directions thereof, and movable members on the mold base cooperating with the said member to form the walls of a casting cavity.

33. A permanent mold for casting metallic articles comprising a mold base, a plurality of stationary mold parts on the base, said stationary mold parts being connected to the mold base and assembled with respect to each other to form a bottom wall for a casting cavity and to permit unrestrained expansion thereof due to the heat of the molten metal being cast and movable mold parts on the mold base cooperating with the said stationary mold parts to form the walls of a casting cavity.

34. A permanent mold for casting metallic articles comprising a mold base, a plurality of cooperating stationary mold parts of different sizes and shapes connected to the mold base and adapted to expand and contract without restraint under the heat of the molten metal being cast, the top surfaces of said stationary mold parts forming the bottom wall of the casting cavity, and movable mold parts on opposite sides of the said stationary mold parts cooperating therewith and having their meeting faces cut away to form the sides and top walls of the casting cavity.

35. A permanent mold for casting a brake shoe comprising a base, and stationary and movable members on the base cooperating to form a casting cavity for a brake shoe, the top surfaces of said stationary members forming the bottom wall of the casting cavity against which is cast the braking surface of a brake shoe, the said stationary and movable members being substantially isoexpansive and non-warping under operating conditions.

In testimony whereof we hereunto affix our signatures this first day of April, 1925.

ALLEN B. NORTON.
MARIUS GUYOT.